(12) United States Patent
Strom et al.

(10) Patent No.: US 9,777,817 B2
(45) Date of Patent: Oct. 3, 2017

(54) CLUTCH DEVICE WITH A FRICTION TRANSMISSION ELEMENT

(71) Applicant: ZF Friedrichshafen AG, Friedrichshafen (DE)

(72) Inventors: Alexander Strom, Bad Kissingen (DE); Peter Frey, Gerolzhofen (DE); Erwin Wack, Niederwerrn (DE); Michael Heuler, Wuerzburg (DE); Christian Wickel, Wartmannsroth (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/153,863

(22) Filed: May 13, 2016

(65) Prior Publication Data

US 2016/0377159 A1    Dec. 29, 2016

(30) Foreign Application Priority Data

Jun. 26, 2015   (DE) .................. 10 2015 211 942

(51) Int. Cl.
    *F16H 45/02*      (2006.01)
    *F16D 13/58*      (2006.01)

(52) U.S. Cl.
    CPC ............. *F16H 45/02* (2013.01); *F16D 13/58* (2013.01); *F16H 2045/0221* (2013.01)

(58) Field of Classification Search
None
See application file for complete search history.

(56) References Cited

U.S. PATENT DOCUMENTS

| 9,010,507 | B2 | 4/2015 | Vanni |
| 2013/0175131 | A1* | 7/2013 | Iwashita .............. F16H 41/30 |
| | | | 192/3.29 |
| 2014/0318914 | A1 | 10/2014 | Zaugg |
| 2014/0345553 | A1 | 11/2014 | Fambach |

FOREIGN PATENT DOCUMENTS

| DE | 102014207372 | 10/2014 |
| DE | 102013209283 | 11/2014 |

* cited by examiner

*Primary Examiner* — Mark Manley
(74) *Attorney, Agent, or Firm* — Cozen O'Connor

(57) ABSTRACT

A clutch device has a friction transmission element which has a base with at least one friction surface, at least one control element for acting on a damping device, and at least one radial support which cooperates with a stop and has a plurality of lugs which extend at least substantially radially in direction toward the stop and which are at least substantially brought closer to the stop up to a gap before the stop when the friction transmission element is stationary, while, at speed, at least a portion of the lugs comes in contact with the stop. The lugs are connected to the base via a bend which causes an axial offset with respect to the base, the bend allows a displacement of the lugs in direction toward the energy accumulators, and the lugs are completely covered by the stop in an axial extension direction.

6 Claims, 2 Drawing Sheets

CLUTCH DEVICE WITH A FRICTION TRANSMISSION ELEMENT

BACKGROUND OF THE INVENTION

1. Field of the Invention

The present invention relates to a clutch device with a friction transmission element through which an operative connection between a drive and an output can be produced or canceled. The friction transmission element has a base with at least one friction surface, at least one control element for acting on energy accumulators of a damping device, and at least one radial support which acts under the influence of speed, cooperates with a stop and has a plurality of lugs which extend at least substantially radially in direction toward the stop and which are at least substantially brought closer to the stop up to a gap before the stop when the friction transmission element is stationary, while, at speed, at least a portion of the lugs comes in contact with the stop at speed after overcoming the gap.

2. Background/Description of the Related Art

A clutch device of the type mentioned above is known from U.S. Pat. No. 9,010,507 B2. As can be seen particularly from FIG. 9, the clutch device is arranged in a housing of a hydrodynamic torque converter, and the friction transmission element is provided axially between a radial wall of the housing and a clutch element of the clutch device that is controllable through pressure gradients. The friction transmission element is brought into a frictionally engaging connection with the radial wall of the housing in that the clutch element is brought axially closer to the friction transmission element. Preferably, friction facings are provided at the friction transmission element axially between the friction transmission element and the radial wall of the housing and axially between the friction transmission element and the clutch element. When there is a frictionally engaging connection, the clutch device is engaged, whereas the clutch device is disengaged when the clutch element has released the friction transmission element and the frictionally engaging connection is accordingly canceled. The lugs of the radial support are aligned at least substantially axial to the base of the friction transmission element and have only a small axial overlap with the stop which is implemented at an energy accumulator guide for the energy accumulators of the damping device. During contact, this can lead to considerable internal stress on components owing to the very small mutual contact surfaces. Further, it cannot be ruled out that the lugs will miss the stop axially, especially since the friction transmission element is subject to an axial displacement during its engaging movement or disengaging movement and could therefore be moved out of the axial extension region of the stop under unfavorable conditions. In this case, the radially support with respect to the friction transmission element might not take effect. Apart from this, the axial distance between the lugs and the energy accumulators is relatively large, which fosters substantial unwanted degrees of freedom of the energy accumulators in axial direction.

It is an object of the present invention to configure a friction transmission element of a clutch device in such a way that a radial support can reliably take place without considerable stresses on component parts, but unacceptably large axial degrees of freedom of the energy accumulators of a damping device are prevented.

SUMMARY OF THE INVENTION

This and other objects are met in that a clutch device is provided having a friction transmission element through which an operative connection between a drive and an output can be produced or canceled, wherein the friction transmission element has a base with at least one friction surface, at least one control element for acting on energy accumulators of a damping device, and at least one radial support which acts under the influence of speed, cooperates with a stop and has a plurality of lugs which extend at least substantially radially in direction toward the stop and which are at least substantially brought closer to the stop up to a gap before the stop when the friction transmission element is stationary, while, at speed, at least a portion of the lugs comes in contact with the stop at speed after overcoming the gap.

In this regard, it is provided in particular that the lugs are connected to the base via a bend which causes an axial offset with respect to the base, and the bend allows a displacement of the lugs in direction toward the energy accumulators, where the lugs are completely covered by the stop in axial extension direction.

Since the bend causes the lugs to be brought axially closer to the energy accumulators, but without coming in contact with the energy accumulators, the lugs can exercise their function of radial support in the immediate vicinity of the energy accumulators. This is advantageous because some of the influences which can cause a radial displacement of the friction transmission element are contingent upon the energy accumulators such that a transmission of force from the energy accumulators into the friction transmission element and a radial support of the friction transmission element against this transmission of force take place close together. On the one hand, the energy accumulators responsible for this kind of transmission of force can displace radially outward under centrifugal force or at least undergo a curvature radially outward and, on the other hand, the energy accumulators can be subjected to an uncontrolled deformation under friction, by means of which a force with at least one radial component can be exerted on the friction transmission element.

Since the lugs of the friction transmission element are completely covered by the stop in axial extension direction, it is ensured at all times, even when there is an axial displacement of the friction transmission element and, therefore, of the lugs during an engaging movement or releasing movement of the clutch element of the clutch device, that the lugs can nevertheless hit the stop and reliably carry out their function during a radial displacement of the friction transmission element that is superposed on this axial movement.

The bend forms a radial transition between the base of the friction transmission element and the lugs and is advantageous particularly when the friction transmission element cooperates with a clutch element of the clutch device which is switchable in a pressure-dependent manner, since in this way the lugs can be advanced closer to the clutch element which is frequently arranged in the immediate vicinity of the damping device and, therefore, in the immediate vicinity of the energy accumulators.

The stop for the lugs is ideally provided at an energy accumulator guide surrounding the energy accumulators of the damping device in that this energy accumulator guide has at its side facing the friction transmission element an axial projection to form the stop for the lugs of the friction transmission element, which axial projection faces in direction toward the friction transmission element and is formed so as to project axially over the friction transmission element such that the friction transmission element is completely overlapped in axial extension direction.

So that it is ensured in every case that the lugs of the friction transmission element remain out of contact with the energy accumulators of the damping device and thus perform their function of limiting an axial displacement of the friction transmission element without negatively affecting the decoupling quality of the damping device, at least one energy accumulator deflection in circumferential direction is associated in each instance with the lugs and is provided as canting in direction away from the energy accumulators at the respective lug. These cants are provided in each instance in the regions of the end turns of the corresponding energy accumulators and, in the event that end turns of an energy accumulator ever actually come in contact with one of the cants, have the object of deflecting these end turns away from the respective lug.

Ideally, the clutch device having the friction transmission element is received in a housing, preferably in a housing of a hydrodynamic torque converter or wet clutch. By forming the housing at an axial wall with a first recess for the energy accumulator guide, the latter—insofar as this wall forms the radially outer shell of the housing—can be displaced farther radially outward, which allows the largest possible space in circumferential direction for receiving the energy accumulators. In addition or alternatively, by forming the housing at a radial wall with a second recess it can be ensured that the friction transmission element, but particularly a friction facing provided at the friction transmission element, can penetrate into this second recess, and there is accordingly a minimal axial installation space requirement. In a preferred construction, this radial wall is the drive-side housing cover of the housing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The clutch device is described in the following with reference to an embodiment example. The drawings show.

DETAILED DESCRIPTION OF THE PRESENTLY PREFERRED EMBODIMENTS

Figure 1:
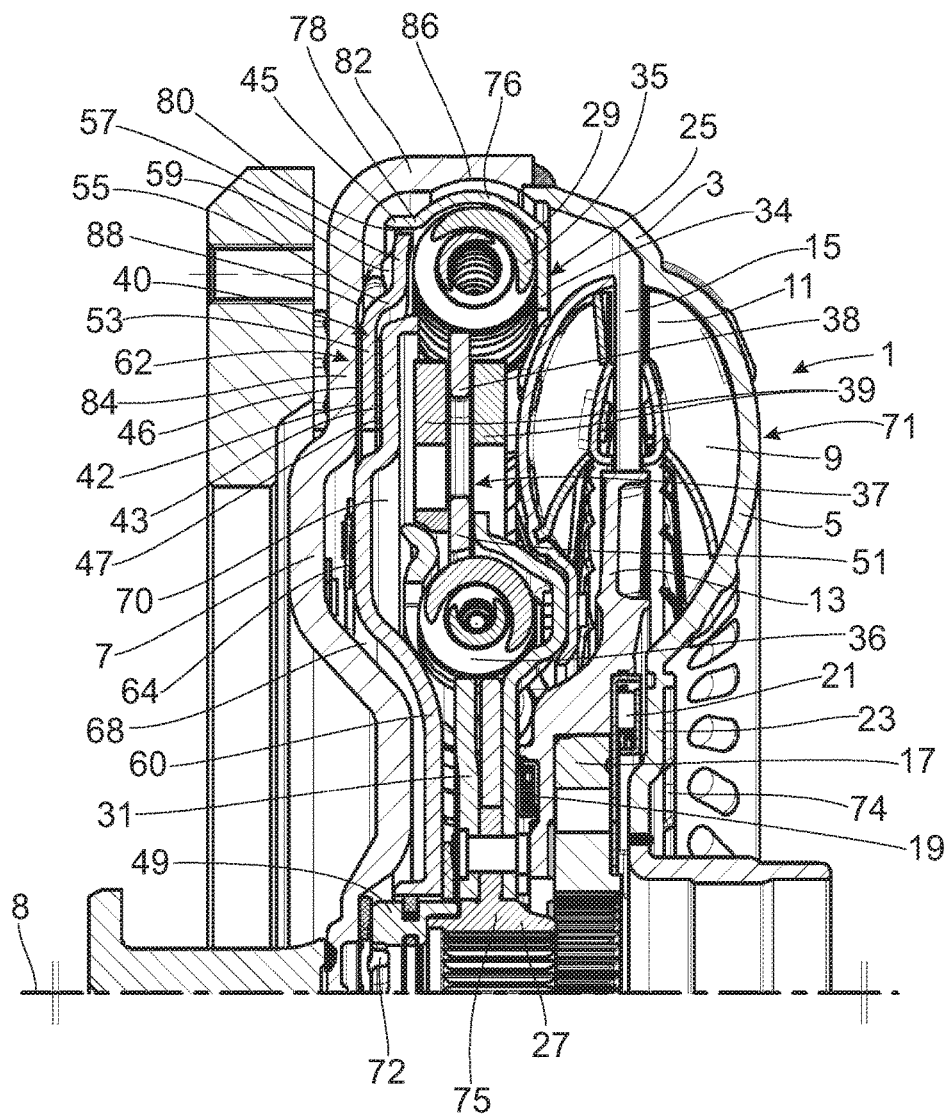
FIG. 1 is a sectional view through a housing of a hydrodynamic torque converter for illustrating the clutch device with the friction transmission element and with a clutch element which is switchable depending on pressure gradients.

FIG. 1 shows a hydrodynamic torque converter 1 which has a housing 3 acting as drive 71 with a housing shell 5 and a housing cover 7. Housing 3 is rotatable around a central axis 8. The housing shell 5 of the housing 3 receives an impeller 9 which cooperates with a turbine 11. Provided axially between the impeller 9 and the turbine 11 is a stator 13 which is arranged on a freewheel 17 which is axially secured by a bearing 19 at one end and by a bearing 21 at the other end. The impeller 9, turbine 11 and stator 13 form a hydrodynamic circuit 15.

While bearing 21 is supported axially at an impeller hub 23 of the impeller 9, bearing 19 of the freewheel 17 serves for axial support of a torsional vibration damper hub 27 of a damping device 25. In a manner which will be explained more fully in the following, this damping device 25 cooperates with a clutch device 62 having a friction transmission element 40 and a clutch element 60. The clutch element 60 is connected by an axial suspension 64 to the housing cover 7 so as to be fixed with respect to rotation but axially displaceable relative to it and receives axially between itself and the housing cover 7 a base 53 of the friction transmission element 40, this base 53 being provided on both sides with friction facings 42, 43 to form friction surfaces 46 and 47. Radially outwardly of the base 53, the friction transmission element 40 transitions by means of a bend 55 into lugs 57 which extend radially outward at least substantially parallel to the housing cover 7 and at a predetermined axial distance from the radially outer first energy accumulators 35 of the damping device 25. Due to the bend 55, the lugs 57 penetrate at least substantially into the axial extension region of the clutch element 60 but extend radially outside of this clutch element 60.

Figure 2:
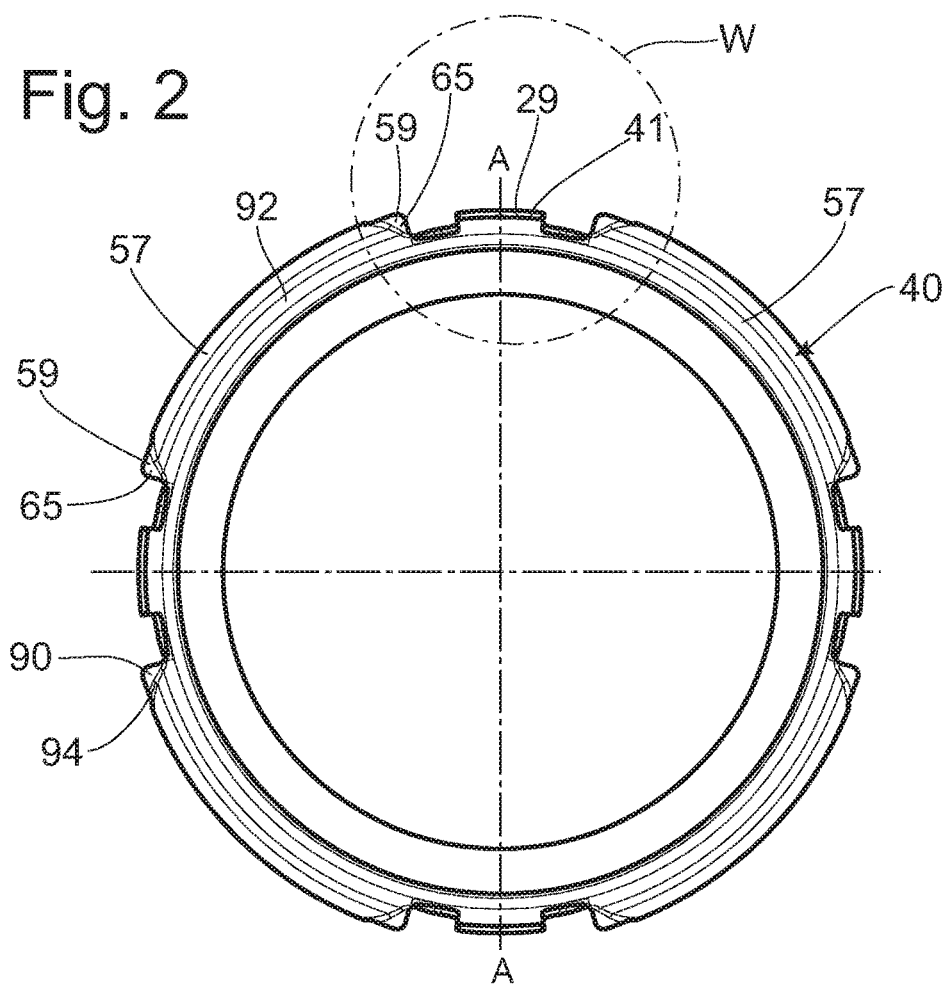
FIG. 2 is a top view of the friction transmission element as detail.
Figure 3:
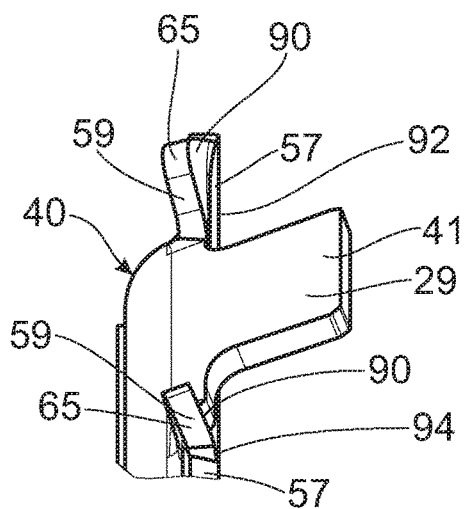
FIG. 3 is a detail of view W in FIG. 2 in perspective.

As is shown in detail in FIG. 2, the lugs 57 are provided at the friction transmission element 40 at predetermined distances from one another in circumferential direction. The lugs 57 have cants 59 in each instance at their circumferential ends. As is shown in FIG. 3, the cants 59 are bent in axial direction. Referring to FIG. 1, these cants 59 extend in direction away from the radially outer first energy accumulators 35 and act, with respect to adjacent end turns of the first energy accumulators 35, as energy accumulator deflections 65. If the end turns of the first energy accumulators 35 should ever come in contact with the lugs 57, these end turns are deflected in direction away from the lugs 57 and, in this way, cause the energy accumulators 35 to be returned to their reference position. Further, the energy accumulator deflections 65 act as protective mechanism because they have, in each instance, a taper 90 relative to the remaining portion 92 of the lug 57 due to the bend that is carried out in axial direction. The respective taper 90 passes into the remaining portion of the lug 57 via a rounded portion 94 and can accordingly restore the energy accumulator in the most shock-free manner possible should it ever come in contact with the lug 57.

Figure 4:
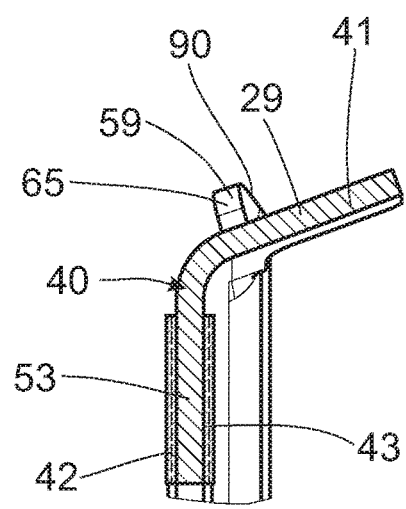
FIG. 4 is a partial sectional view along line A-A in FIG. 2.

As is further shown in FIG. 2, a control element 41 is provided in each instance in circumferential direction between every two lugs 57 and, as is shown in FIG. 4, extends from the base 53 of the friction transmission element 40 at an angle in direction of the first energy accumulators 35. These control elements 41 serve as input 29 of the damping device 25 which is in operative connection to an energy accumulator guide 76 via the first energy accumulators 35. This energy accumulator guide 76 circumscribes the first energy accumulators 35 and, further, has an axial projection 45 at its side facing the housing cover 7. This axial projection 45 serves as a stop 78 for the lugs 57 of the friction transmission element 40 and, for this purpose, is guided in direction toward the housing cover 7 until it not only completely covers the lugs 57 axially but, in addition, also projects axially beyond the lugs 57. Together with a hub disk 51 which extends radially inward and serves as damper mass carrier 38 of a mass damper system 37 having damper masses 39, the energy accumulator guide 76 forms an intermediate transmission element 34 of the damping device 25. The hub disk 51 is supported radially inward at radially inner second energy accumulators 36 which engage at an output 31 of the damping device 25 by their respective opposite ends, this output 31 being connected to the torsional vibration damper hub 27, already mentioned, so as to be fixed with respect to rotation relative to it. The torsion damper hub 27 acts as an output 75.

The torsional vibration damper hub 27 which is connected to the turbine 11 so as to be fixed with respect to rotation relative to it centers a bearing sleeve 49 at its side remote of the turbine 11, which bearing sleeve 49 takes over the function of a carrier for the clutch element 60 of the clutch device 62. With regard to the friction transmission element 40, it should be added that the friction facings 42, 43 are formed with grooves, indicated by dashed lines in FIG. 4, which allow pressure medium to flow between a first pressure space 68 and a second pressure space 70. The first pressure space 68 is provided axially between the housing cover 7 and the clutch element 60 and is provided with pressure medium by means of a first channel 72. On the other hand, the second pressure space 70 is located at the side of the clutch element 60 remote of the first pressure space 68 and is supplied with pressure medium via a second channel 74. A positive pressure in the first pressure space 68 results in a displacement of the clutch element 60 in direction toward the damping device 25, while a positive pressure in the second pressure space 70 causes a movement of the clutch element 60 in the opposite direction. In the former case, the clutch element 60 releases the friction transmission element 40 and, therefore, the friction facings 46 and 47 and accordingly disconnects the input 29 of the damping device 25 from the housing cover 7 of the housing 3. The clutch device 62 is accordingly released. In contrast, a positive pressure in the second pressure space 70 causes the clutch device 62 to be engaged in that the clutch element 60 is pressed against the friction transmission element 40, and a connection is produced in this way between the input 29 of the damping device 25 and the housing cover 7 of the housing 3 via the friction facings 42 and 43 and, therefore, via the friction surfaces 46 and 47. The clutch device 62 is then engaged.

In the region of its radial outer circumference, the housing cover 7 extends at least substantially as axial wall 82 which has a first recess 86 at its side facing the damping device 25 in the axial extension region of the adjacent energy accumulator guide 76. Further, the housing cover 7 extends with its region extending radially inside of the radial outer circumference at least substantially as radial wall 84 which has a second recess 88 at its side facing the friction transmission element 40 in axial extension region of the adjacent friction facing 42.

The function of the friction transmission element 40 with respect to the lugs 57 is such that, ideally, in a first operating state of the hydrodynamic torque converter 1, for example, when stationary, the lugs 57 have in each instance a gap 80 relative to the axial projection 45 of the energy accumulator guide 76 and, therefore, relative to the stop 78. Ideally because, insofar as the friction disk element 40 should undergo a radial decentering in a movement state of the hydrodynamic torque converter 1 preceding this operating state, one of the lugs 57, possibly even two lugs 57 adjacent to one another, comes in contact with the stop 78. Of course, the clearance 80 between the corresponding lug 57 and the stop 78 is then used up. On the other hand, in a second operating state of the hydrodynamic torque converter 1, for example, in the movement state, radial forces can be directed to the friction transmission element 40 which ensure a decentering of the friction transmission element 40. Radial forces of this kind can be caused by an unbalanced torque transmission between the drive 71 and output 75, but also by radial displacements of the energy accumulators 35 induced by centrifugal force and/or friction. However, radial displacements of the friction transmission element 40 which are caused in this way are limited when the lug 57 located in displacement direction, or the lugs 57 located in displacement direction, comes, or come, in contact with the axial projection 45 of the energy accumulator guide 76 and, therefore, with the stop 78 after clearance 80 is used up. This limiting of the radial displacement of the friction transmission element 40 can prevent damage to the friction transmission element 40, but particularly also damage to the clutch element 60 of the clutch device 62. Damage of this kind would occur if the friction transmission element 40, particularly in the region of bend 55, came in contact with the radial outer end of the clutch device 62 during a very strong radial displacement of the friction transmission element 40, so that considerable abrasion would result due to a relative movement in circumferential direction particularly when the clutch device 62 is released or partially released.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A clutch device (62) comprising:
a piston plate (60);
a drive-side housing cover (7)
a single friction transmission element (40) for operatively producing or canceling a connection between a drive (71) and an output (75);
said friction transmission element (40) comprising a radially extending base (53) lined by at least one friction surface (46,47) and disposed axially between said piston plate (60) and said housing cover (7) and at least one control element (41) extending from the radially extending base (53) of said transmission element (40) at an angle in the direction of and for acting on energy accumulators (35) of a damping device (25);
a stop (78) formed as an axial extension of an energy accumulator guide (76);
said friction transmission element (40) acting under the influence of speed and cooperating with said stop (78), said friction transmission element (40) further comprising a plurality of lugs (57) extending at least substantially radially adjacent the energy accumulators in a direction toward the stop (78), said plurality of lugs (57) being at least substantially brought closer to said stop (78) up to a radially extending gap (80) before said stop (78) when said friction transmission element (40)

is stationary, while, at speed, at least a portion of said lugs (57) are coming into contact with said stop (78) after overcoming the gap (80); said friction transmission element (40) further comprising a bend (55) connecting said at least substantially radially extending lugs (57) to said radially extending base (53) and to cause an axial offset of said lugs (57) with respect to said base (53); said bend (55) permitting a displacement of said lugs (57) in the direction toward the energy accumulators (35); and wherein said lugs (57) are completely covered by said stop (78) in an axial extension direction; and wherein each of said lugs (57) of said plurality of lugs comprises at least one energy accumulator deflection (65), said energy accumulator deflection (65) comprising a canting (59) at a circumferential end of said respective lug (57) in a direction away from the energy accumulators (35).

2. The clutch device (62) according to claim 1, wherein said bend (55) forms a radial transition between said base (53) and said lugs (57).

3. The clutch device (62) according to claim 1, additionally comprising a clutch element (60) which is axially displaceable with respect to said friction transmission element (40); and wherein said bend (55) at said friction transmission element (40) is provided radially outside of said clutch element (60) for an at least predominantly axial overlap with said clutch element (60).

4. The clutch device (62) according to claim 1, additionally comprising the energy accumulator guide (76) which radially circumscribes the energy accumulators (35) and which comprises an axial projection (45) at a side facing said friction transmission element (40); said axial projection (45) facing in a direction toward said friction transmission element (40) and acting as said stop (78) for said lugs (57) of said friction transmission element (40); and wherein said axial projection (45) is formed so as to project axially over said friction transmission element (40) such that said friction transmission element (40) is completely overlapped in an axial extension direction.

5. The clutch device (62) according to claim 1, wherein said at least one energy accumulator deflection (65) associated in each instance in circumferential direction with said lugs (57) comprises in each instance a taper (90) relative to a remaining portion (92) of said lug (57) due to bending of said cant (59) in an axial direction and wherein said respective taper (90) passes into a remaining portion (92) of said lug (57) via a rounded portion (94).

6. The clutch device (62) according to claim 1, additionally comprising a transmission-side housing shell forming together with said drive-side housing shell a housing (3) for receiving said friction transmission element (40) and said clutch element (60), and wherein said housing (3) comprises a first recess (86) for the energy accumulator guide (76) at an axial wall (82) and/or a second recess (88) at a radial wall for a friction facing (42, 43) provided at said friction transmission element (40).

\* \* \* \* \*